Figure 1:
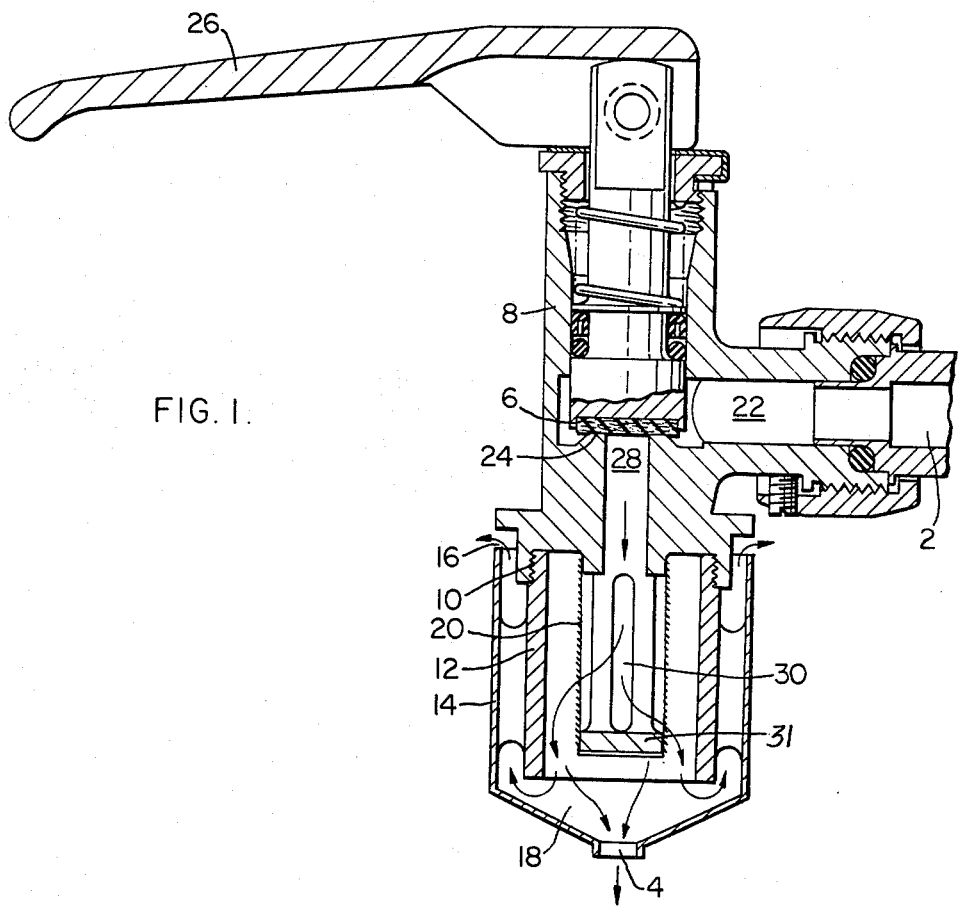

United States Patent [19]

Hayes

[11] 4,207,916
[45] Jun. 17, 1980

[54] TAP

[75] Inventor: Cecil Hayes, East Sussex, England

[73] Assignee: W. M. Still & Sons Limited, Hastings, England

[21] Appl. No.: 937,541

[22] Filed: Aug. 28, 1978

Related U.S. Application Data

[63] Continuation of Ser. No. 755,191, Dec. 29, 1976, abandoned.

[30] Foreign Application Priority Data

Jan. 13, 1976 [GB] United Kingdom ................. 1245/76

[51] Int. Cl.² .............................................. F16T 1/45
[52] U.S. Cl. .................................... 137/171; 137/801; 251/154
[58] Field of Search ................... 137/561 A, 171, 801; 251/154, 155

[56] References Cited

U.S. PATENT DOCUMENTS

| | | | |
|---|---|---|---|
| 403,704 | 5/1889 | Stuart | 137/171 |
| 568,145 | 9/1896 | Sanderson | 137/171 |
| 2,405,639 | 8/1946 | Boosey | 137/801 |
| 2,578,543 | 12/1951 | Harr | 137/604 X |
| 2,641,335 | 6/1953 | Berg | 137/171 |
| 2,908,227 | 10/1959 | McDougall | 137/604 X |
| 3,664,369 | 5/1972 | Johnson | 137/550 X |

Primary Examiner—William R. Cline
Attorney, Agent, or Firm—Wood, Herron & Evans

[57] ABSTRACT

A tap the body of which is formed with a liquid passage having an inlet and an outlet and being provided with a valve member between the inlet and outlet to control flow of liquid therebetween characterized in that the body has a second outlet communicating with the valve member and the first outlet above the height of the first outlet when the tap is positioned for use.

15 Claims, 2 Drawing Figures

TAP

This is a continuation of application Ser. No. 755,191 filed Dec. 29, 1976, now abandoned.

The present invention relates to taps, suitable for use for example on liquid dispensing apparatus such as water heaters or boilers.

Hot liquid under pressure from a boiler often discharges with a high velocity making it difficult and dangerous for an operator to fill a small vessel such as a drinking cup from a tap controlling the flow of the liquid from the boiler. This is particularly so when a quick action tap is used where there is little or no control over the extent of opening of the tap.

A tap according to the invention comprises a valve member located between a liquid inlet and a liquid outlet, to control the flow of liquid to the outlet and a further outlet being located between the valve member and the first outlet above the height of the first outlet when the tap is positioned for use.

The invention also extends to a device for connection to the outlet of a standard tap and comprising an inlet to communicate with the tap outlet, and a first or main outlet, a further outlet being located between the inlet and first outlet above the height of the first outlet when the device is attached to a tap ready for use.

The further outlet provides a means whereby vapour from the liquid may escape without going through the first outlet and hence hot boiling water or the like can be discharged from the tap more smoothly and less explosively (and basically only under the influence of gravity) than with previously proposed taps.

Preferably an expansion chamber is provided between the valve member and the outlets. Such a chamber enables the liquid vapour to separate from the liquid and pass out of the further outlet.

A filter may be provided between the valve member and the outlets to trap particles e.g. scale, passing through the tap and this filter may be removable for cleaning purposes.

Figure 2:
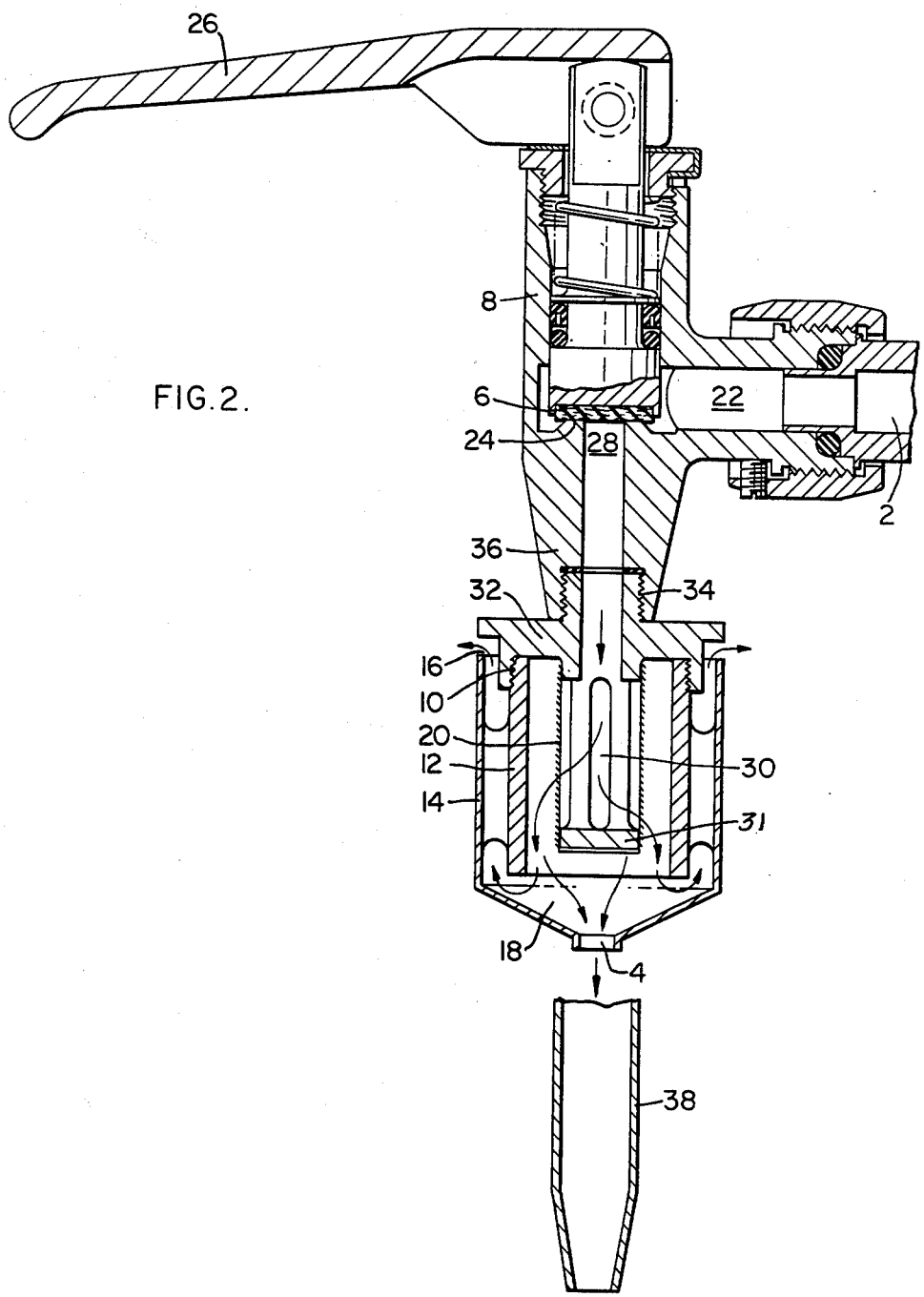

The invention will now be described with reference to the accompanying drawings in which:

FIG. 1 is a cross-section of one embodiment of tap according to the invention, and FIG. 2 is a cross-section of a modified version of the tap.

Referring to FIG. 1 it will be seen that the tap has an inlet 2, a first or main outlet 4 and a valve member 6. The valve body 8 has a lower threaded portion 10 to which is screwed the inner wall 12 of a casing, the outer wall 14 of which includes at its lower end the first outlet 4 and is open at its upper end to provide a further outlet 16 between the inner and outer walls. Inner wall 12 of the casing forms part of the sides of an expansion chamber 18 which is located between the valve member 6 and outlets 4 and 16. Also included within the casing is a filter 20 which is removable for cleaning by unscrewing the casing from the threaded portion 10 of the body 8.

Liquid e.g. boiling water enters the inlet 2 from a boiler (not shown) in which the pressure may be as much as 4.5 p.s.i. The liquid then passes through an inlet duct 22 formed in the inlet connection to the valve member 6 which when opened from its valve seat 24 by lifting the handle 26 allows the liquid to pass through the valve seal into an outlet duct 28, against and past deflector 31 (as shown in FIG. 1), and thence through slots 30 and the filter 20, which traps particles such as scale, to the expansion chamber 10. In the expansion chamber liquid vapour such as steam rises between the walls 12, 14 of the casing to the further outlet 16 and liquid falls through the first outlet 4.

This has the effect of removing pressure from the liquid being discharged.

The filter may readily be removed for cleaning or replacement by unscrewing the casing from the tap body.

Referring to FIG. 2 it can be seen that the casing is modified by the provision of a top plate 32 formed with a male screw thread 34 which is screwed into a tapped hole at the bottom end 36 of a standard tap body. Such an adaptor device, which is in accordance with a feature of this invention, enables a standard tap very readily to be converted into a tap in accordance with the invention.

If desired a spout device 38 may be attached to the outlet 4 of the adaptor.

What we claim is:

1. A tap structure for controlling the discharge of a liquid that will partially vaporize upon discharge, said tap structure comprising
   a valve body structured to define an inlet duct and an outlet duct for said liquid,
   a valve member carried in said valve body, said valve member being movable between open and close positions between said inlet and outlet ducts for controlling flow of said liquid from said inlet duct to said outlet duct, and
   expansion chamber structure connected to said outlet duct, said expansion chamber including a deflector interiorly thereof, said liquid being receivable against said deflector in said expansion chamber from said outlet duct, said liquid partially vaporizing in said expansion chamber prior to discharge therefrom, and said expansion chamber structure defining a first outlet structure positioned to discharge that portion of said liquid in a liquid state and a second outlet structure positioned relative to said first outlet duct structure to discharge that portion of said liquid in a vapor state, said first and second outlet structures cooperating to lessen the pressure of that liquid state portion discharged from said first outlet structure by permitting the vapor state portion to discharge through said second outlet structure.

2. A tap structure as set forth in claim 1, said tap structure further comprising
   a filter connected to said outlet duct, said liquid passing through said filter prior to discharge through said first and second outlet structures.

3. A tap structure as set forth in claim 1, said first and second outlet structures being generally coaxial with said outlet duct, said second outlet structure being elevated above said first outlet structure relative to ground level during use of said tap structure.

4. A tap structure as set forth in claim 3, said liquid state portion and said vapor state portion of said liquid being exhausted from said first and second outlet structures in directions generally opposite one to the other.

5. A tap structure as set forth in claim 4, said tap structure comprising
   an inner casing and an outer casing, said inner and outer casings being generally coaxial and said outer casing being disposed generally outwardly of said inner casing, said outlet duct being connected to one end to said inner casing, and said inner casing defining an exhaust end opening into said expansion chamber at the other end.

6. A tap structure for controlling the discharge of a liquid that will partially vaporize upon being discharged from said tap structure, said tap structure being connectable with a valve body structured to define an inlet duct and an outlet duct for said liquid, and said valve body carrying a valve member movable between open and close positions relative to said inlet and outlet ducts for controlling flow of said liquid from said inlet duct to said outlet duct, said tap structure comprising an expansion chamber connectable with said outlet duct, said expansion chamber including a deflector interiorly thereof, said liquid being receivable against said deflector to provide liquid and vapor state discharge portions of said liquid for discharge from said tap structure, a first outlet structure defined in said expansion chamber, said first outlet structure being positioned to discharge that portion of said liquid in a liquid state, and a second outlet structure also defined in said expansion chamber, said second outlet structure being positioned relative to said first outlet duct structure to discharge that portion of said liquid in a vapor state, said first and second outlet structures cooperating to lessen the pressure of that liquid state portion discharged from said first outlet structure by permitting the vapor state portion to discharge through said second outlet structure.

7. A tap structure as set forth in claim 6, said tap structure further comprising a filter connectable to said outlet duct, said liquid passing through said filter prior to discharge through said first and second outlet structures.

8. A tap structure as set forth in claim 6, said tap structure including thread means permitting said tap structure to be connected to said valve body.

9. A tap structure as set forth in claim 6, said first and second outlet structures being generally coaxial with said outlet duct, said second outlet structure being elevated above said first outlet structure relative to ground level during use of said tap structure.

10. A tap structure as set forth in claim 9, said liquid state portion and said vapor state portion of said liquid being exhausted from said first and second outlet structures in directions generally opposite one to the other.

11. A tap structure as set forth in claim 10, said tap structure comprising an inner casing and an outer casing, said inner and outer casings being generally coaxial and said outer casing being disposed generally outwardly of said inner casing, said outlet duct being connected to one end to said inner casing, and said inner casing defining an exhaust end opening into said expansion chamber at the other end.

12. A method for controlling the discharge of a liquid from a tap, said liquid being subjected to heat and pressure conditions prior to discharge that will cause said liquid to partially vaporize upon discharge from said tap, said method comprising the steps of controlling the discharge of said liquid from said tap through use of a valve member carried in a valve body, said valve member being movable between open and close positions relative to inlet and outlet ducts of said valve body for stopping and starting flow of said liquid from said tap, passing said liquid directly into an expansion chamber from said outlet duct and impinging said liquid against a deflector mounted within said expansion chamber, said liquid partially vaporizing in said expansion chamber prior to discharge therefrom, discharging that portion of said liquid in a liquid state in said expansion chamber from a first exhaust outlet defined in said expansion chamber, discharging that portion of said liquid in a vapor state in said expansion chamber from a second exhaust outlet defined in said expansion chamber, said first and second outlets cooperating to lessen the pressure of that liquid state portion discharged from said first outlet by permitting the vapor state portion to discharge through said second outlet, thereby lessening the spitting of that liquid state portion discharged from said tap.

13. A method as set forth in claim 12, including the step of orienting said first and second outlets generally coaxial with said outlet duct, said second outlet being elevated above said first outlet relative to ground level during use of said method.

14. A method as set forth in claim 13, said liquid state portion and said vapor state portion of said liquid being exhausted from said first and second outlets in directions generally opposite one to the other.

15. A method as set forth in claim 14, said method further comprising the step of passing said liquid through a filter prior to discharge of said liquid into said expansion chamber.

* * * * *

UNITED STATES PATENT AND TRADEMARK OFFICE
CERTIFICATE OF CORRECTION

PATENT NO. : 4,207,916
DATED : June 17, 1980
INVENTOR(S) : Cecil Hayes

It is certified that error appears in the above-identified patent and that said Letters Patent are hereby corrected as shown below:

Column 2, line 68 change "to" to --at--.

Column 4, line 7 change "to" to --at--.

Signed and Sealed this

Twenty-sixth Day of August 1980

[SEAL]

Attest:

SIDNEY A. DIAMOND

*Attesting Officer*     *Commissioner of Patents and Trademarks*